US009686820B2

(12) United States Patent
Chetlur et al.

(10) Patent No.: US 9,686,820 B2
(45) Date of Patent: Jun. 20, 2017

(54) TRANSFERRING DATA BETWEEN MOBILE DEVICES HAVING HETEROGENEOUS WIRELESS COMMUNICATION INTERFACES

(71) Applicant: International Business Machines Corporation, Armonk, NY (US)

(72) Inventors: Malolan Chetlur, Bangalore (IN); Vijay Ekambaram, Tamilnadu (IN); Vikrant Nandakumar, Bangalore (IN); Ashok Pon Kumar Sree Prakash, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 14/567,257

(22) Filed: Dec. 11, 2014

(65) Prior Publication Data

US 2016/0174061 A1 Jun. 16, 2016

(51) Int. Cl.
*H04W 84/18* (2009.01)
*H04W 40/02* (2009.01)
*H04W 88/06* (2009.01)
*H04W 8/22* (2009.01)

(52) U.S. Cl.
CPC .............. *H04W 84/18* (2013.01); *H04W 8/22* (2013.01); *H04W 40/02* (2013.01); *H04W 88/06* (2013.01)

(58) Field of Classification Search
CPC ....... H04W 8/18; H04W 84/18; H04W 88/06; H04W 8/22; H04L 45/00
See application file for complete search history.

(56) References Cited

U.S. PATENT DOCUMENTS

| 8,826,022 | B1 * | 9/2014 | Iyer | G06Q 50/01 705/40 |
| 2004/0147223 | A1 * | 7/2004 | Cho | H04L 12/66 455/41.2 |
| 2010/0257239 | A1 * | 10/2010 | Roberts | G06Q 10/10 709/204 |

\* cited by examiner

*Primary Examiner* — Joseph Dean, Jr.
(74) *Attorney, Agent, or Firm* — Ryan, Mason & Lewis, LLP

(57) ABSTRACT

Methods, systems and computer program products for transferring data between mobile devices having heterogeneous wireless communication interfaces includes identifying one or more intermediate mobile devices from social network databases upon detecting an initiation of data transfer from a first mobile device to a second mobile device, wherein the first and second mobile devices have heterogeneous wireless communication interfaces, and wherein the intermediate mobile devices have wireless communication interface compatibility to form an ad hoc wireless network with the first and second mobile devices for transferring data from the first to the second mobile device; implementing the ad hoc wireless network based on availability of the intermediate mobile devices; and transferring the data from the first to the second mobile device through the ad hoc wireless network, wherein said transferring includes hopping the data through each of the intermediate mobile devices from the first to the second mobile device.

15 Claims, 3 Drawing Sheets

TRANSFERRING DATA BETWEEN MOBILE DEVICES HAVING HETEROGENEOUS WIRELESS COMMUNICATION INTERFACES

TECHNICAL FIELD

The present application relates to transferring data between mobile devices having heterogeneous wireless communication interfaces.

BACKGROUND

One consistent trend in mobile computing space is the use of a variety of wireless communication protocols in data transfer. Wireless data transfer through the Internet includes using various communication protocols such as general packet radio service (GPRS), evolution-data optimized (EVDO), etc. Alternatively, the use of other communication protocols such as Bluetooth® (registered trademark of BLUETOOTH SIG, INC. in the United States, other countries, or both), Wi-Fi Direct® and other related protocols are gaining popularity.

Use of the Internet involves a cost, as compared to alternative communication protocols such as Bluetooth®, near field communication (NFC), Wi-Fi Direct® and the like. At times, due to cost concerns, a user may not want to send a large data file (for example, a movie file) from his or her mobile device to a recipient mobile device over the Internet, but may want to instead utilize an alternative wireless communication protocol such as Bluetooth®, NFC, Wi-Fi Direct®, etc. However, there may be practical difficulties in transferring data through this approach. For example, the transmission range of the Bluetooth® communication protocol is approximately 3-300 feet, and therefore, if the recipient is beyond this range, file transfer may not be possible. Additionally, there is the issue of having heterogeneous communication interfaces. If the recipient mobile device does not have a Bluetooth® communication protocol on his or her mobile device, the above approach does not work.

SUMMARY

A method, system and a computer program product for transferring data between mobile devices having heterogeneous wireless communication interfaces includes identifying one or more intermediate mobile devices from one or more social network databases upon detecting an initiation of data transfer from a first mobile device to a second mobile device, wherein the first and second mobile devices have heterogeneous wireless communication interfaces, and wherein the one or more intermediate mobile devices have wireless communication interface compatibility to form an ad hoc wireless network with the first and second mobile devices for transferring data from the first mobile device to the second mobile device; implementing, at least partially, the ad hoc wireless network based on availability of the one or more intermediate mobile devices for transferring the data; and transferring the data from the first mobile device to the second mobile device through the ad hoc wireless network, wherein said transferring includes hopping the data through each of the one or more intermediate mobile devices from the first mobile device to the second mobile device.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
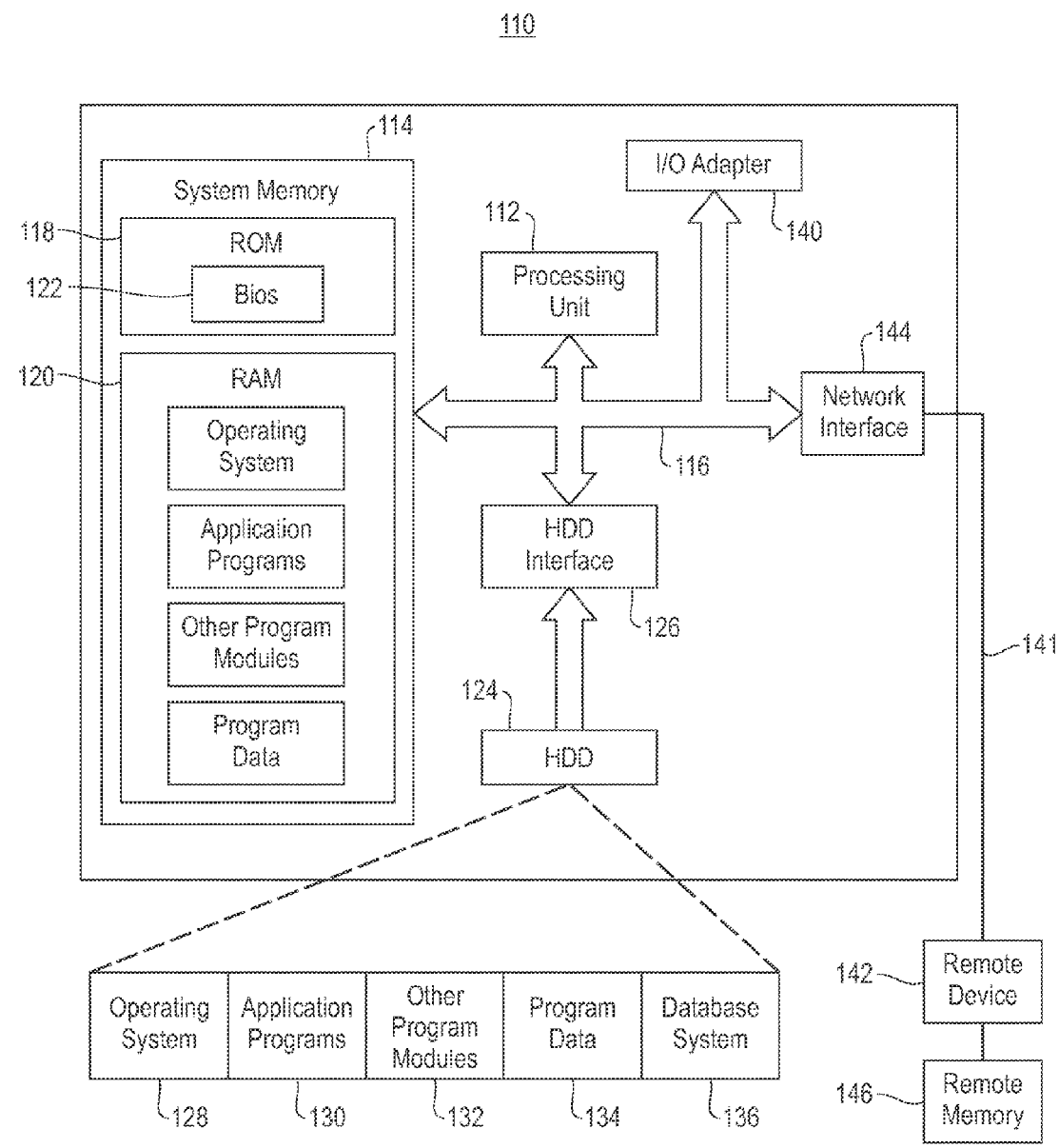
FIG. 1 illustrates a block diagram of a computing system for implementing embodiments of the present invention.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 illustrates a block diagram of a computing system for implementing an embodiment of the present invention. The computing system includes a computing device 110, which in turn includes a processing unit 112, a system memory 114, and a system bus 116 that couples various system components including the system memory 114 to the processing unit 112. The system bus 116 may be any of several types of bus architectures, including a memory bus, a memory controller, a peripheral bus, and a local bus using any of a variety of bus architectures, such as a peripheral component interconnect (PCI). The system memory 114 includes a Read Only Memory (ROM) 118 and a Random Access Memory (RAM) 120. A Basic Input/Output System (BIOS) 122, containing the basic routines that help to transfer information between elements within the computing device 110, such as during start-up, is stored in the ROM 118. The computing device 110 further includes a Hard Disk Drive (HDD) 124 as computer-readable storage media. The HDD 124 is connected to the system bus 116 by an HDD interface 126. The HDD 124 provides a non-volatile storage for computer-readable instructions, data structures, program modules, and other data for the computing device 110. Although the exemplary environment described herein employs the HDD 124, it should be appreciated by those skilled in the art that other types of computer-readable storage media, which can store data that is accessible by computer, such as RAM, ROM, removable magnetic disks, removable optical disks, and the like may also be used in the exemplary operating environment.

A number of program modules may be stored on the HDD 124, including an operating system 128, one or more application programs 130, other program modules 132, program data 134, and a database system 136. The operating system 128, the one or more application programs 130, the other program modules 132 and the program data 134 may be loaded onto the system memory 114 and specifically onto the RAM 120 during the functioning of the computing device 110. A user may provide commands and information through input devices, such as a keyboard, and receive output through peripheral output devices, such as monitor, speaker, printer, etc. These input and output devices are often connected to the processing unit 112 through an I/O adapter 140 coupled to the system bus 116.

In a networked environment, the computing device 110 may be connected to a remote computing device 142 through a network interface card 144. It will be appreciated that the network connections shown are exemplary, and any conventional means 141 of establishing communications links between the computers, such as a local area network, wide area network or wireless connection, may be used. In a networked environment, program modules depicted relative to the computing device 110, or its components, may be stored in a remote memory 146. The remote computing device 142 may be a personal computer, a router, a server, a network personal computer (PC), a peer device, or other common network device.

Those of the ordinary skill in the art will appreciate that the hardware in FIG. 1 is a basic computing system and may vary. The architecture of the aforementioned computing device is not limiting and is only depicted as an example on which an embodiment of the present invention may be implemented. Other types of computing systems such as a smart phone or a web-kiosk are well within the intended scope on which an embodiment of the present invention may be implemented.

Figure 2:
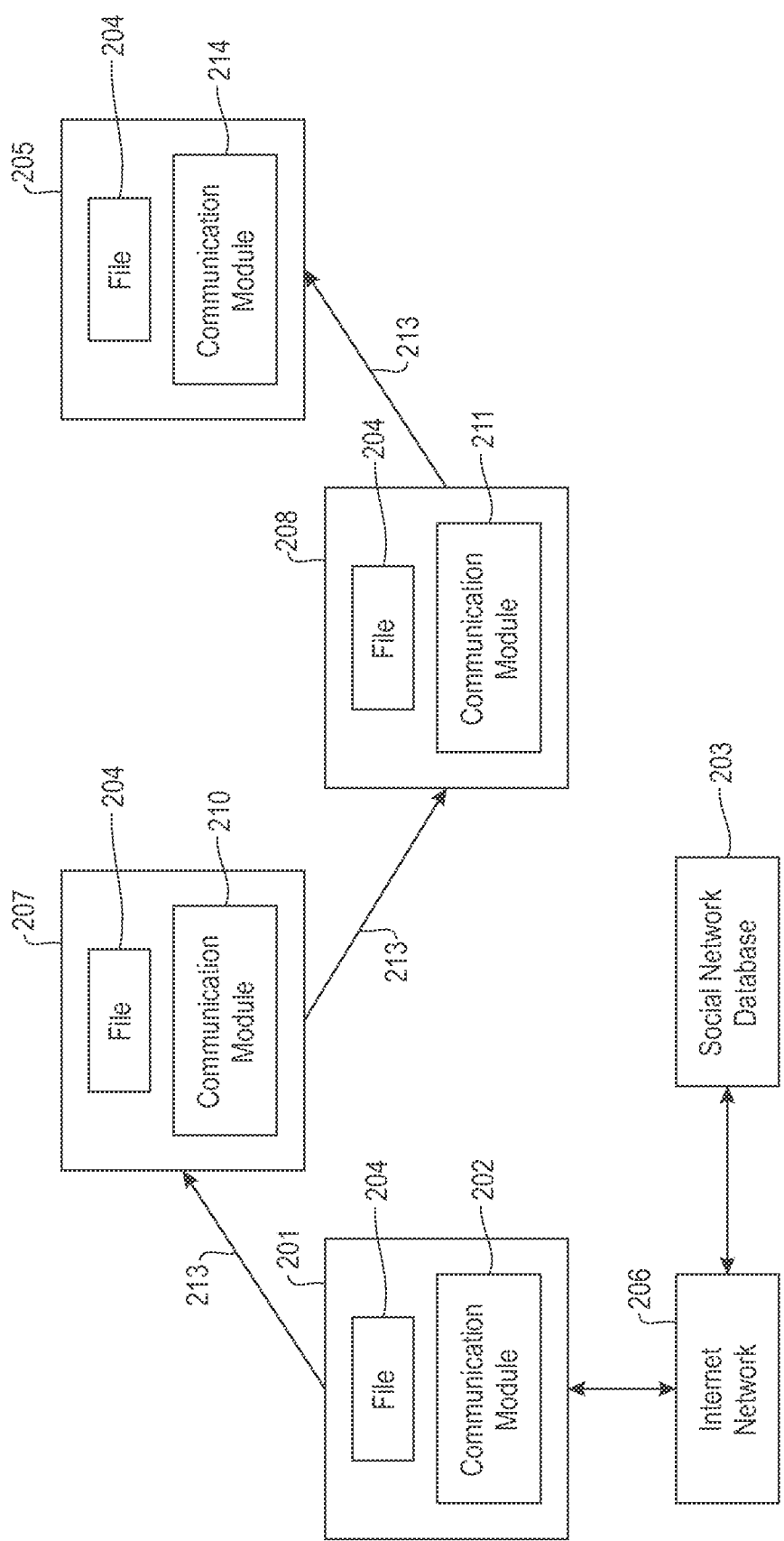
FIG. 2 illustrates a block diagram of a system for implementing embodiments of the present invention.

FIG. 2 depicts a system for implementing an embodiment of the present invention. A first mobile device 201, comprises a communication module 202 therein (comprising computer program instructions) configured to establish bi-directional communication with a social network database 203 (such as Facebook® or the like), typically implemented in a computer system as depicted in FIG. 1. According to an example embodiment of the invention, whenever a first user of the first mobile device 201 initiates a data transfer, for example a multimedia file 204 (hereinafter referred to as file or data interchangeably) of a size exceeding a pre-defined threshold limit (for example more than 10 megabytes (MB)), to a recipient second user using a second mobile device 205 having a communication module 214 similar to the communication module 202, the communication module 202 detects the initiation of the file transfer and optionally provides the first user a choice to transfer the file through it (that is, communication module 202) using alternative wireless communication protocols such as Bluetooth®, Wi-Fi Direct® or the like, enabled or provided on the first mobile device 201. Upon the first user selecting to transfer the file 204 through the communication module 202, the communication module 202 establishes a communication link with the social network database 203 through an active Internet connection 206, if any, available on the first mobile device 201. According to a different embodiment of the invention, the communication module 202 can wait until an active Internet connection 206 is available and/or obtain consent of the first user to communicate through the active Internet connection 206 of the first mobile device 201 to establish a communication link with the social network database 203.

According to yet another embodiment of the invention, a minimum portion of the communication module 202 required to detect initiation of a file transfer may be implemented in the first mobile device 201, while a majority of functional portions of the communication module 202 may be implemented in a remote computer system (as depicted in FIG. 1), for example, in a cloud computing system. Upon detecting initiation of the file transfer from the first mobile device 201 by the portion of the communication module 202 native to the first mobile device 201, the portion of the communication module 202 in the cloud computing system operably connected to the portion of the communication module 202 native to the first mobile device 201 through Internet connection 206 is activated to establish the communication link with the social network database 203 and perform other functions as described hereinafter. Alternatively, the communication module 202 may be implemented as a part of a mobile application of the social network database 203 generally provided for use on mobile devices.

The communication module 202 queries the social network database 203 to detect the presence of communication module 214 in the second mobile device 205, and if yes, identifies a list of trusted contacts (such as friends, connections, buddies, or any other terminology coined in the social network database) of the first user and/or second users, and more particularly, trusted contacts having mobile devices with a communication module similar to the communication module of the first mobile device installed therein, so as to establish a bridge between the first 201 and second mobile 205 devices. For example, there may be trusted contacts common to both the first and second users. In an another scenario, when there may be no common trusted contact between the first and second users, the communication module 202 may look-up in the list of trusted contacts of one or more of the trusted contacts of first or second users (generally termed as 'friends of friends') to establish a link between the first and second user.

The fact that a user of the social networking database 203 has a mobile device is generally known information to the social networking database since most social networking databases provide a mobile application (thereof) to be installed on the mobile devices. Thus, if a user has downloaded a mobile application of the social networking database 203, details of mobile device including identity, current location, availability of wireless communication protocols in the mobile device, etc. are known to the social networking database 203.

The communication module 202, upon receiving the list of mobile devices of the trusted contacts who can preliminarily form a bridge between the first and second users, according to an embodiment of the invention, identifies from the list one or more mobile devices (hereinafter referred to as intermediate mobile devices) based on the given device's ability to form a compatible ad hoc wireless network with the first 201 and second 205 mobile devices based on communication protocols such as Bluetooth®, Wi-Fi Direct® or the like. As used herein, compatible refers to the ability to bridge and/or overcome the heterogeneous wireless communication protocols of the first and second mobile devices, if any, to enable the data transfer between the first 201 and second 205 mobile devices without an active Internet connection. For example, if the first mobile device 201 has only Bluetooth® but no Wi-Fi Direct®, and the second mobile device 205 has no Bluetooth® but only Wi-Fi Direct®, the intermediate mobile device, if only one, needs to have both Bluetooth® and Wi-Fi Direct® so that the intermediate device can receive the data from the first mobile device 201 through Bluetooth® and transmit the same to the second mobile device 205 through Wi-Fi Direct®. However, if there is no intermediate mobile device which has both the aforementioned communication protocols, there should be at least one intermediate mobile device which has two communication protocols common to the preceding and subsequent mobile devices in the bridge or path, one for receiving the file from a preceding intermediate mobile device (or first mobile device 201) and a second for transmitting the file to the subsequent intermediate mobile device in the bridge (or to the second mobile device 205). For example, as shown in Table 1 below, device 3 has two wireless communication protocols (Wi-Fi Direct® and ZigBee®) which are respectively common to the preceding intermediate mobile device (device 2) and subsequent second mobile device (device 4).

TABLE 1

| Device Name | Bluetooth ® | Wi-Fi Direct ® | ZigBee ® |
| --- | --- | --- | --- |
| First mobile device (device 1) | Yes | No | No |
| First Intermediate | Yes | No | Yes |

TABLE 1-continued

| Device Name | Bluetooth ® | Wi-Fi Direct ® | ZigBee ® |
| --- | --- | --- | --- |
| mobile device (device 2) | | | |
| Second Intermediate mobile device (device 3) | No | Yes | Yes |
| Second mobile device (device 4) | No | Yes | No |

The list of one or more intermediate mobile devices may further be pruned based on one or more pre-defined parameters such as a minimum threshold power state in the mobile devices, the level of trust worthiness associated with the first and/or second users indicated in the social network database, if any (for example, the trusted contacts in the social network database may have been classified as family, relative, best friend, etc., and a relationship score assigned thereto), bandwidth availability and current or future location proximity with the first and/or second mobile devices, which can provide the highest end-to-end data rate between the first and second mobile devices.

Upon finalizing the list of intermediate mobile devices (207, 208) and their order in the bridge or path between the first and second mobile devices, the communication modules (210, 211) corresponding to each of the intermediate mobile devices (207, 208) are activated and readied to establish the ad hoc wireless network 213 comprising the first 201, second 205 and the intermediate mobile devices (207, 208). Readying or activating the communication modules (202, 210, 211, 214) may include functions such as seeking and receiving a permission of users of the intermediate mobile devices (207, 208) for performing one or more aforementioned and hereinafter described functions including controlling a storage area within the intermediate mobile devices (207, 208) to which the users of the intermediate mobile devices may not be provided access (for security concerns).

Subsequently, the ad hoc wireless network 213 is established at least partially based on the availability of each intermediate mobile device (207, 208). For example, referring again to the aforementioned Table 1, as soon as the first intermediate 207 mobile device is readied (that is, consent is obtained) and within the Bluetooth® communication range with the first mobile device 201, the first user is prompted to initiate or approve the file transfer and power on the Bluetooth® in the first mobile device 201. Alternatively, the communication modules (202, 210, 211, 214) may be provided operating control over the functioning of the wireless communication protocols of their respective mobile devices (201, 207, 208, 205) and thus the communication modules powers on the Bluetooth® of the first mobile device 201 and first intermediate mobile device 207 to establish an ad hoc wireless network 213 therebetween without any interference of the respective users. After the ad hoc wireless network 213 is established, the file 204 is transferred from the first mobile device 201 to the first intermediate mobile device 207, thus completing one hop.

According to another embodiment of the invention, after the first user consents to implement the file transfer through the communication module 202, the communication module 202 may store the file 204 to be transferred in a storage area allocated to the communication module 202 of the first mobile device 201. The first user at this time may be alerted with a message that 'the data transfer may not be implemented immediately and is based on availability of intermediate mobile devices' or a similar message to warn the first user of possible delay in establishing an end-to-end ad hoc wireless network 213 with the second mobile device 205. Subsequently, as described above, whenever the first intermediate mobile device 207 is available, the communication module 202 may complete the aforementioned hop of the file 204 from first mobile device 201 to the first intermediate mobile device 207 without any involvement of the first user or the user of the first intermediate mobile device 207.

The file 204 is received in a storage area in the first intermediate mobile device 207 controlled by the communication module 210 of the first intermediate mobile device 207. The file 204 may be encrypted before being transferred from the first mobile device 201. Access to the storage area in the first intermediate mobile device 207 may denied or restricted to the user of the first intermediate device 207. Various other possible security related features known to a person skilled in the art may be implemented by the communication modules (202, 210, 211, 214)) of the given mobile devices. Until the next hop from the first intermediate mobile device 207 to the second intermediate mobile device 208 (or to the second mobile device 205 if there is only one intermediate device), the file 204 remains in the storage area of the first intermediate mobile device 207. Upon transferring the received file 204 from the first intermediate mobile device 207 to the second intermediate mobile device 208, no copy thereof may be retained in the first intermediate mobile device 207, nor in the second intermediate device 208, after transfer of the file 204 therefrom to the second mobile device 205. However, optionally, pre-defined logs of the data transfer may be retained.

The subsequent hops of the file 204 from the first intermediate mobile device 207 to the second intermediate mobile device 208, and finally, to the second mobile device 205 may be completed in a similar fashion as described above. The first user and users of the intermediate mobile devices (207, 208) may be notified of the completion of the file transfer.

According to an embodiment of the invention, the communication module 202 of the first mobile device 201 may be configured to monitor and control the entire data transfer process, whereas the other communication modules (210, 211, 214) of the intermediate mobile devices (207, 208) and the second mobile device 205, respectively, may be configured to be junior or subordinate to the first mobile device 201. Thus, the communication modules (202, 210, 211, 214) may be configured to function as either configuration, and are to be able to communicate with each other. Various other possible variations in design and configuration of the communication modules are possible to achieve the aforementioned, and as such, the aforementioned techniques are not to be construed as limiting. Preparing computer program instructions to design and configure a communication module in various ways to achieve the aforementioned is generally known to a person skilled in the art.

Figure 3:
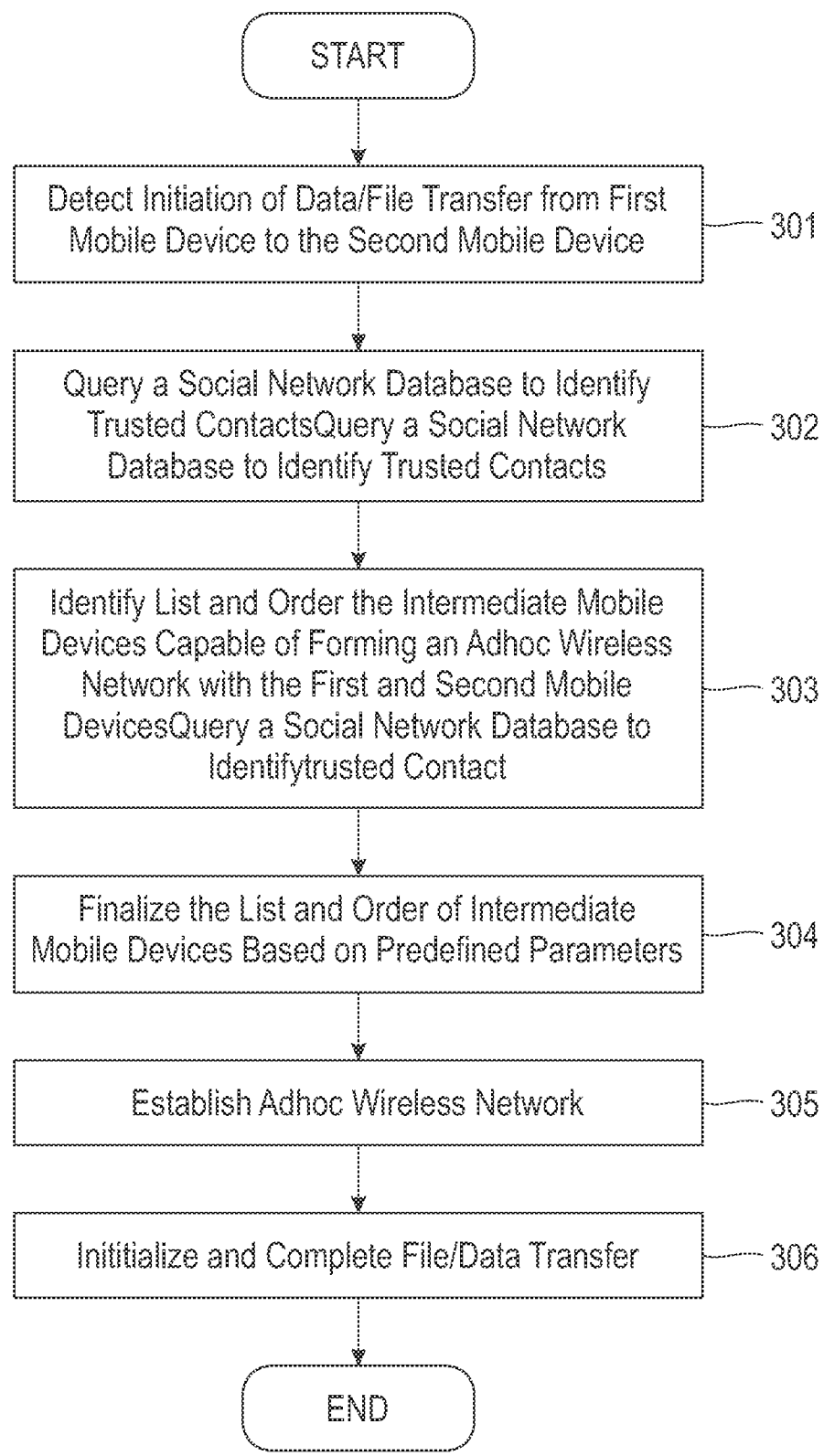
FIG. 3 illustrates a flowchart depicting steps to be performed for implementing an embodiment of the present invention.

FIG. 3 illustrates a flowchart depicting steps to be performed for implementing an embodiment of the present invention. At step 301, a communication module in a first mobile device detects initiation of a data transfer, for example, a multimedia file (hereinafter referred to as file or data interchangeably) of a size exceeding a pre-defined threshold limit (for example more than 10 MB), to a recipient second user using a second mobile device having a communication module similar to the communication module of the first mobile device.

At step 302, the communication module queries the social network database to detect a presence of a communication module in the second mobile device, and if such a presence exists, the communication module identifies identify a list of trusted contacts (such as friends, connections, buddies, or any other terminology coined in the social network database) of the first user and/or second user, more particularly, trusted contacts having mobile devices with the communication module installed therein, so as to establish a bridge between the first and second mobile devices. For example, there may be trusted contacts common to both the first and second users. In an another scenario, when there may be no common trusted contact between the first and second users, the communication module may look-up the list of trusted contacts of one or more of the trusted contacts of the first or second users (generally termed as 'friends of friends') to establish a link between the first and second user.

The communication module of the first mobile device queries the social network database by establishing a bi-directional communication with a social network database (such as Facebook® or the like), typically implemented in a computer system such as depicted in FIG. 1. According to an example embodiment of the invention, whenever the first user of the first mobile device initiates the file transfer to the recipient second user of the second mobile device, the communication module of the first mobile device optionally provides the first user a choice to transfer the file through the communication module using alternative wireless communication protocols such as Bluetooth®, Wi-Fi Direct® or the like that are enabled or provided on the first mobile device. Upon the first user selecting to transfer the file through its communication module, the communication module of the first mobile device establishes a communication link with the social network database through an active Internet connection, if any, available on the first mobile device. According to a different embodiment, the communication module may wait until an active Internet connection is available and/or obtain consent of the first user to communicate through the active Internet connection of the first mobile device to establish a communication link with the social network database.

According to yet another embodiment of the invention, a minimum portion of the communication module required to detect initiation of file transfer may be implemented in the first mobile device, while a majority of the functional portions of the communication module may be implemented in a remote computer system, such as depicted in FIG. 1 (for example a cloud computing system). Upon detecting initiation of the file transfer from the first mobile device by the portion of the communication module native to the first mobile device, the portion of the communication module in the cloud computing system operably connected to the portion of the communication module native to the first mobile device through an Internet connection is activated to establish the communication link with the social network database and to perform other functions as described herein. Alternatively, the communication module may be implemented as a part of a mobile application of the social network database generally provided for use on mobile devices.

The fact that a user of the social networking database has a mobile device is generally known information to the social networking database because most social networking databases provide a mobile application (thereof) to be installed on the mobile device. Thus, if a user has downloaded a mobile application of the social networking database, details of mobile device including identity, current location, availability of wireless communication protocols in the mobile device, etc. is known to the social networking database.

At step 303, the communication module, upon receiving the list of mobile devices of the trusted contacts who can preliminarily form a bridge between the first and second users, and according to an example embodiment of the invention, identifies from the list one or more mobile devices (hereinafter referred to as intermediate mobile devices) based on the devices' ability to form a compatible ad hoc wireless network with the first and second mobile devices via communication protocols such as Bluetooth®, Wi-Fi Direct® or the like. Compatible, as used herein and noted above, refers to the ability to bridge or overcome the heterogeneous wireless communication protocols of the first and second mobile devices to enable the file transfer between the first and second mobile devices without an active Internet connection. For example, if the first mobile device has only Bluetooth® but no Wi-Fi Direct® and the second mobile device has no Bluetooth® but only Wi-Fi Direct®, the intermediate mobile device, if only one, needs to have both Bluetooth® and Wi-Fi Direct® so that the intermediate device can receive the file from the first mobile device through Bluetooth® and transmit the same to the second mobile device through Wi-Fi Direct®. However, if there is no intermediate mobile device which has both the aforementioned wireless communication protocols, there should be at least one intermediate mobile device which has two wireless communication protocols common to the preceding and subsequent mobile devices in the bridge, one for receiving the data from a preceding intermediate mobile device (or the first mobile device) and a second for transmitting the data to the subsequent intermediate mobile device in the bridge (or to the second mobile device). For example, as shown in the aforementioned Table 1, device 3 has two wireless communication protocols (Wi-Fi Direct® and ZigBee®) which are respectively common to the preceding intermediate mobile device (device 2) and subsequent second mobile device (device 4).

At step 304, the list of intermediate mobile devices and their order in the bridge or path between the first and second mobile devices is finalized, preferably after pruning the list based on one or more pre-defined parameters such as a minimum threshold power state in the mobile devices, the level of trustworthiness with the first and/or second users indicated in the social network database, if any (for example, the trusted contacts in the social network database may have been classified as family, relative, best friend, etc., and a relationship score assigned thereto), bandwidth availability and current or future location proximity with the first and/or second mobile devices, which can provide the highest end-to-end data rate between the first and second mobile devices.

At step 305, the ad hoc wireless network is established. According to an example embodiment of the invention, the ad hoc wireless network is established at least partially based on the availability of each intermediate mobile device. Additionally, the communication module of the first mobile device and any available intermediate devices to be used in establishing the ad hoc wireless network are activated and readied. Readying or activating the communication modules may include functions such as seeking and receiving the permission of users of the intermediate mobile devices for performing one or more aforementioned and hereinafter described functions including controlling a storage area within the intermediate mobile devices to which the users of the intermediate mobile devices may not be provided access (for security concerns).

At step 306, file transfer is initiated and completed by hopping the file from the first mobile device through each intermediate mobile device to the second mobile device. For example, referring again to the aforementioned Table 1, as soon as the first intermediate mobile device is readied (that is, consent is obtained) and within the Bluetooth® communication range of the first mobile device, the first user is prompted to initiate or approve the data transfer and power-on the Bluetooth® in the first mobile device. Alternatively, the communication modules may be provided operating control over the wireless communication protocols of their respective mobile devices, and thus the communication modules power-on the Bluetooth® of the first mobile device and first intermediate mobile device to establish the partial ad hoc wireless network therebetween without any interference of the respective users. After the partial ad hoc wireless network is established, the file is transferred from the first mobile device to the first intermediate mobile device, thus completing one hop.

According to another embodiment of the invention, after the first user consents to implement the file transfer through the communication module, the communication module may store the file to be transferred in a storage area allocated to the communication module of the first mobile device. The first user, at this time, may be alerted with a message that 'the data transfer may not be implemented immediately and is based on availability of intermediate mobile devices' or a similar message to warn the first user of possible delay in establishing an end-to-end ad hoc wireless network with the second mobile device. Subsequently, as described above, whenever the first intermediate mobile device is available, the communication module may complete the aforementioned hop of the file from the first mobile device to the first intermediate mobile device without any involvement of the first user or the user of the first intermediate mobile device.

As noted herein, the file is received in a storage area in the first intermediate mobile device controlled by the communication module of the first intermediate mobile device. The file may be encrypted before being transferred from the first mobile device, and access to the storage area in the first intermediate mobile device may be denied or restricted to the user of the first intermediate device. Various other possible security related features known to a person skilled in the art may be implemented by the communication modules of mobile devices. Until the next hop from the first intermediate mobile device to the second intermediate mobile device (or the second mobile device if there is only one intermediate device), the file remains in the storage area of the first intermediate mobile device. Upon transferring the received file from the first intermediate mobile device to the second intermediate mobile device, no copy thereof may be retained in the first intermediate mobile device, nor in the second intermediate device, after the transfer of the file therefrom to the second mobile device. However, optionally, pre-defined logs of the data transfer may be retained.

Additionally, as detailed herein, the subsequent hops of the file from the first intermediate mobile device to the second intermediate mobile device, and finally to the second mobile device may be completed in a similar fashion described above. The first user and the users of the intermediate mobile devices may be notified of the completion of the file transfer.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What we claim is:

1. A method for transferring data between mobile devices having heterogeneous wireless communication interfaces, the method comprising: establishing a bi-directional communication with one or more social network databases; identifying, via the established bi-directional communication, one or more intermediate mobile devices from said one or more social network databases upon detecting an initiation of data transfer from a first mobile device to a second mobile device, wherein the first and second mobile devices have heterogeneous wireless communication interfaces, and wherein the one or more intermediate mobile devices have wireless communication interface compatibility to form an ad hoc wireless network with the first and second mobile devices for transferring data from the first mobile device to the second mobile device, wherein said identifying comprises querying the one or more social network databases to access one or more wireless communication interface details, maintained in the one or more social network databases, pertaining to multiple mobile devices, wherein each of said multiple mobile devices comprises a downloaded application associated with the one or more social networks, and wherein (i) the first mobile device, (ii) the second mobile device, and (iii) the one or more intermediate mobile devices are among the multiple mobile devices; implementing, at least partially, the ad hoc wireless network based on availability of the one or more intermediate mobile devices for transferring the data; and transferring the data from the first mobile device to the second mobile device through the ad hoc wireless network, wherein said transferring includes hopping the data through each of the one or more intermediate mobile devices from the first mobile device to the second mobile device, and wherein said hopping comprises: transferring the data from the first mobile device to a first of the one or more intermediate mobile devices, having at least one or more similar wireless communication interfaces; storing the data within the first intermediate mobile device until a further subsequent intermediate mobile or the second mobile device becomes available in the ad hoc wireless network; and resuming the data transfer from the first intermediate mobile device to the further subsequent intermediate mobile or the second mobile device upon the further subsequent intermediate mobile device or the second mobile device becoming available-in the partial ad hoc wireless network, wherein said identifying is further based on one or more pre-defined parameters including a minimum threshold power state of each intermediate mobile device, a level of trust worthiness of the first and/or second mobile devices indicated in the social network database, bandwidth availability, and location proximity with the first mobile device and/or the second mobile device.

2. The method of claim 1, wherein the ad hoc wireless network is a trusted path having a highest end-to-end data rate between the first and second mobile devices.

3. The method of claim 1, wherein the data from the one or more intermediate devices are deleted after transferring therefrom.

4. The method of claim 1, comprising:
obtaining permission of said one or more intermediate devices for said transferring of the data.

5. The method of claim 1, comprising:
controlling a storage area within said one or more intermediate mobile devices, wherein said one or more intermediate mobile devices do not have access to said storage area.

6. A system for transferring data between mobile devices having heterogeneous wireless communication interfaces, the system comprising: a memory; and at least one processor coupled to the memory and configured to: establish a bi-directional communication with one or more social network databases; identify, via the established bi-directional communication, one or more intermediate mobile devices from one or more social network databases upon detecting an initiation of data transfer from a first mobile device to a second mobile device, wherein the first and second mobile devices have heterogeneous wireless communication interfaces, and wherein the one or more intermediate mobile devices have wireless communication interface compatibility to form an ad hoc wireless network with the first and second mobile devices for transferring data from the first mobile device to the second mobile device ,wherein said identifying comprises querying the one or more social network databases to access one or more wireless communication interface details, maintained in the one or more social network databases, pertaining to multiple mobile devices, wherein each of said multiple mobile devices comprises a downloaded application associated with the one or more social networks, and wherein (i) the first mobile device, (ii) the second mobile device, and (iii) the one or more intermediate mobile devices are among the multiple mobile devices; implement, at least partially, the ad hoc wireless network based on availability of the one or more intermediate mobile devices for transferring the data; and transfer the data from the first mobile device to the second mobile device through the ad hoc wireless network, wherein said transferring includes hopping the data through each of the one or more intermediate mobile devices from the first mobile device to the second mobile device, and wherein said hopping comprises: transferring the data from the first mobile device to a first of the one or more intermediate mobile devices; storing the data within the first intermediate mobile device until a further subsequent intermediate mobile or the second mobile device becomes available in the ad hoc wireless network; and resuming the data transfer from the first intermediate mobile device to the further subsequent intermediate mobile or the second mobile device upon the further subsequent intermediate mobile device or the second mobile device becoming available in the partial ad hoc wireless network, wherein said identifying is further based on one or more pre-defined parameters including a minimum threshold power state of each intermediate mobile device, a level of trust worthiness of the first and/or second mobile devices indicated in the social network database, bandwidth availability, and location proximity with the first mobile device and/or the second mobile device.

7. The system of claim 6, wherein the ad hoc wireless network is a trusted path having a highest end-to-end data rate between the first and second mobile devices.

8. The system of claim 6, wherein the data from the one or more intermediate devices are deleted after transferring therefrom.

9. The system of claim 6, wherein the at least one processor is further configured to:
obtain permission of said one or more intermediate devices for said transferring of the data.

10. The system of claim 6, wherein the at least one processor is further configured to:
control a storage area within said one or more intermediate mobile devices, wherein said one or more intermediate mobile devices do not have access to said storage area.

11. A computer program product for transferring data between mobile devices having heterogeneous wireless communication interfaces, the computer program product comprising a non-transitory computer readable storage medium having program code embodied therewith, the program code executable by a processor for: establishing a bi-directional communication with one or more social network databases; identifying, via the established bi-directional communication, one or more intermediate mobile devices from one or more social network databases upon detecting an initiation of data transfer from a first mobile device to a second mobile device, wherein the first and second mobile devices have heterogeneous wireless communication interfaces, and wherein the one or more intermediate mobile devices have wireless communication interface compatibility to form an ad hoc wireless network with the first and second mobile devices for transferring data from the first mobile device to the second mobile device , wherein said identifying comprises querying the one or more social network databases to access one or more wireless communication interface details, maintained in the one or more social network databases, pertaining to multiple mobile devices, wherein each of said multiple mobile devices comprises a downloaded application associated with the one or more social networks, and wherein (i) the first mobile device, (ii) the second mobile device, and (iii) the one or more intermediate mobile devices are among the multiple mobile devices; implementing, at least partially, the ad hoc wireless network based on availability of the one or more intermediate mobile devices for transferring the data; and transferring the data from the first mobile device to the second mobile device through the ad hoc wireless network, wherein said transferring includes hopping the data through each of the one or more intermediate mobile devices from the first mobile device to the second mobile device, and wherein said hopping comprises: transferring the data from the first mobile device to a first of the one or more intermediate mobile devices; storing the data within the first intermediate mobile device until a further subsequent intermediate mobile or the second mobile device becomes available in the ad hoc wireless network; and resuming the data transfer from the first intermediate mobile device to the further subsequent intermediate mobile or the second mobile device upon the further subsequent intermediate mobile device or the second mobile device becoming available in the partial ad hoc wireless network, wherein said identifying is further based on one or more pre-defined parameters including a minimum threshold power state of each intermediate mobile device, a level of trust worthiness of the first and/or second mobile devices indicated in the social network database, bandwidth availability, and location proximity with the first mobile device and/or the second mobile device.

12. The computer program product of claim 11, wherein the ad hoc wireless network is a trusted path having a highest end-to-end data rate between the first and second mobile devices.

13. The computer program product of claim 11, wherein the data from the one or more intermediate devices are deleted after transferring therefrom.

14. The computer program product of claim 11, wherein the program code is further executable by a processor for:
obtaining permission of said one or more intermediate devices for said transferring of the data.

15. The computer program product of claim 11, wherein the program code is further executable by a processor for:
controlling a storage area within said one or more intermediate mobile devices, wherein said one or more intermediate mobile devices do not have access to said storage area.

\* \* \* \* \*